United States Patent [19]

Rinn

[11] 4,453,313
[45] Jun. 12, 1984

[54] METHOD AND APPARATUS FOR PRECISION TURNING

[75] Inventor: Jürgen Rinn, Launsbach, Fed. Rep. of Germany

[73] Assignee: Heyligenstaedt & Co. Werkzeugmaschinenfabrik GmbH, Giessen, Fed. Rep. of Germany

[21] Appl. No.: 265,424

[22] Filed: May 20, 1981

[30] Foreign Application Priority Data

May 23, 1980 [DE] Fed. Rep. of Germany ....... 3019680

[51] Int. Cl.³ .............................................. G01B 5/25
[52] U.S. Cl. ................. 33/178 D; 33/174 Q; 33/181 R
[58] Field of Search ................. 33/185, 178 D, 169 B, 33/169 R, 174 Q, 181 R; 82/14 D, 1 C, 2 B

[56] References Cited

U.S. PATENT DOCUMENTS

| 1,195,330 | 8/1916 | Binney | 33/178 D |
| 1,339,384 | 5/1920 | Douglass | 33/178 D X |
| 4,215,482 | 8/1980 | Szewczyk | 33/178 D X |

Primary Examiner—Harry N. Haroian
Attorney, Agent, or Firm—Cantor and Lessler

[57] ABSTRACT

Method and apparatus for precision turning horizontally clamped workpieces which are inclined to sag, by means of a numerically controlled lathe.

3 Claims, 1 Drawing Figure

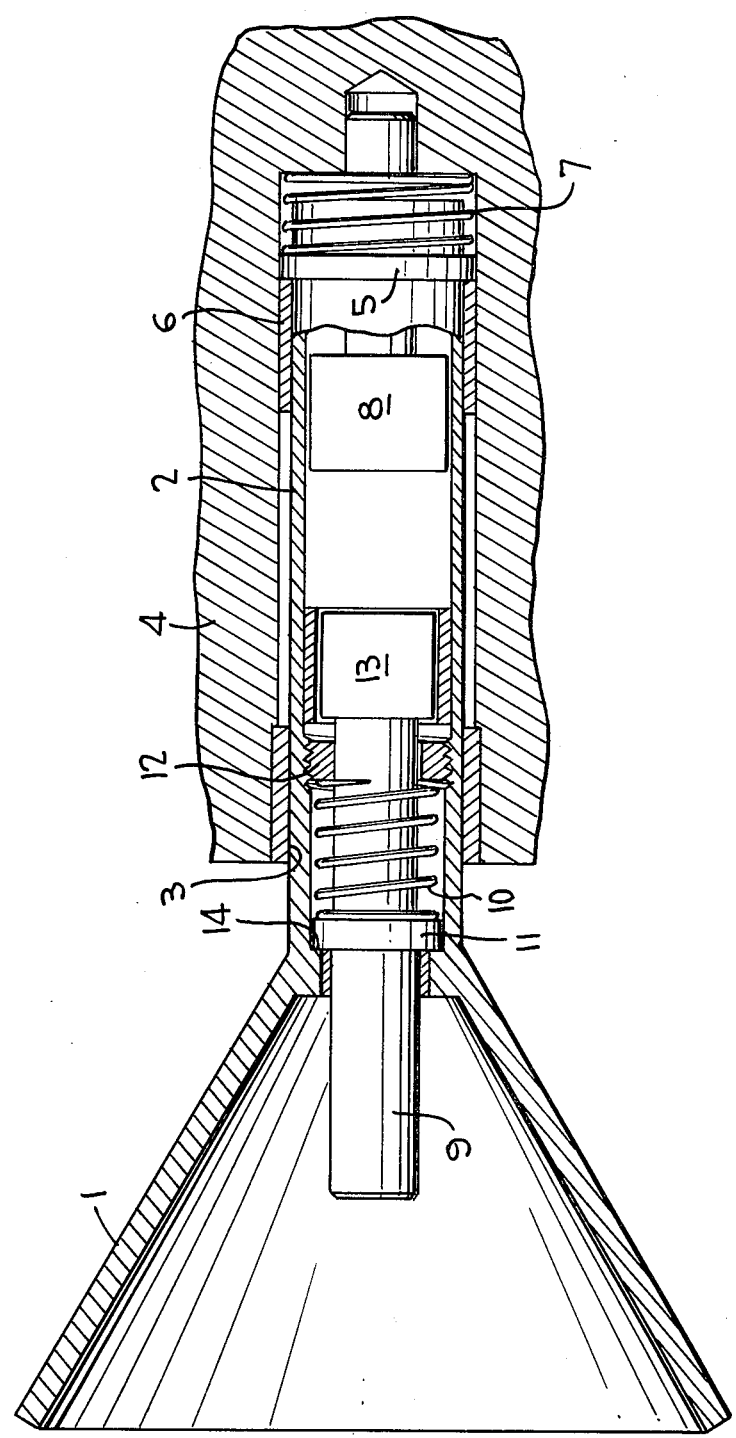

METHOD AND APPARATUS FOR PRECISION TURNING

BACKGROUND OF THE INVENTION

This invention relates to a method for precision turning (smoothing, finish turning) horizontally clamped workpieces, which are inclined to sag, by means of a numerically controlled lathe. Further, the invention relates to an apparatus for carrying out this method.

With the known lathes of this kind, sagging of the horizontally clamped workpiece is prevented by self-centering back rests which consist of two arms bearing rollers and of which the closing and opening movements describe an arc. A third roller is mounted between the two arms on a displaceable center sleeve and is as a rule located vertically below the workpiece. The closing and opening process is initiated by the numerical control of the lathe. The initial setting force is produced by means of a hydraulic pump and is variable. These self-centering back rests are mounted on an auxiliary bed of the lathe and can, after release of their clamping on the auxiliary bed guide tracks, be displaced into any position parallel to the turning centre of the lathe and reclamped.

According to the requirements of the workpiece to be worked, several stationary rests can be displaced over the workpiece length. Also known is the practice of letting a back rest travel with the tool so that the workpiece is always supported at the point at which the cutting tool is located.

The arrangement of such back rests is of course relatively elaborate especially as their position and their opening and closing rhythm must be programmed. Moreover, the lathe must have an auxiliary bed with auxiliary guide tracks for the back rests.

SUMMARY OF THE INVENTION

The invention is based on the object of developing a method of the aforementioned kind, by which back rest support of the workpiece can be eliminated, but which nevertheless allows workpieces of high dimensional accuracy to be produced. Further, a particularly simple apparatus for carrying out this method is provided.

The first-mentioned object is achieved according to the invention by the fact that immediately before precision working by means of a measuring device both the diameter and the slack of the workpiece are ascertained and the slack is taken into consideration as a correction value for the feed motion of the tool.

The advantage of the invention lies first of all in that precision turning is possible without back rest support of the workpieces. By this means, precision turning can take place on conventional lathes which do not have any special guide tracks for the back rests. Special attention is also to be drawn to the fact that the method according to the invention is to be carried out simply and rapidly without great electronic output, as establishment of the slack takes place simultaneously with establishment of the workpiece diameter, which is necessary besides, before precision turning.

According to workpiece shape and length, it is appropriate either to determine the workpiece diameter and the slack at several points or to be satisfied with determination of the highest point of the workpiece and thereby to determine its deflection curve by calculation.

The second-mentioned object is achieved by providing an apparatus having a angle sensor connected to the cross-slide of the lathe, and a first measuring device for determining the displacement of the angle sensor relative to the cross-slide. The angle sensor has a plunger on its bisector, and a second measuring device for determining the diameter of the piece to be turned. The apparatus according to the invention, is distinguished by the fact that it is constructed extremely simply and thus can be manufactured cheaply. Further, on account of its simple construction it operates exceedingly precisely and reliably. The angle sensor can be disposed directly on the cross-slide or on a structure connected to the cross-slide, such as for example a tool holder.

It is particularly appropriate if the angle sensor is resiliently displaceably mounted in the feed direction of the lathe, as then there is measured directly the proportion of slack which is also to be taken into consideration in the feed motion.

BRIEF DESCRIPTION OF THE DRAWING

The apparatus according to the invention will be described below by reference to the preferred embodiment. This apparatus is shown schematically in the drawing, wherein only half of the apparatus was drawn.

DESCRIPTION OF THE PREFERRED EMBODIMENT

The apparatus has a angle sensor 1 of which the two arms form an angle of preferably 60°. The angle sensor 1 is disposed on a sleeve 2 which is mounted axially displaceably in a bore 3 of a cross-slide 4 of the lathe. This bore 3 extends in the feed direction of the lathe tools.

The sleeve 2 has a collar 5 which is held by a compression spring 7 against a stationary stop 6 on the angle sensor side. The compression spring 7 is in addition on the other hand supported against the cross-slide 4. A measurement pick-up 8 is capable of determining displacement of the sleeve 2 against the force of the compression spring 7.

In the sleeve 2 is displaceably disposed a plunger 9. A compression spring 10 is supported against a collar 11 of the plunger 9 and against a shoulder 12 of the sleeve 2. In this way, the collar 11 is held against a stop 14 of the sleeve 2 in a normal position. A second measurement pick-up 13 is capable of determining displacement of the plunger 9 out of this normal position against the force of the compression spring 10.

The method according to the invention is carried out as follows. By means of the cross-slide 4, the apparatus according to the invention is moved to the workpiece into a position corresponding to the nominal workpiece diameter there. In the process, first the plunger 9 reaches the workpiece. The plunger is then displaced against the force of the compression spring 10 into the sleeve 2 until the angle sensor 1 likewise abuts the workpiece. As the angle sensor 1 and the sleeve 2 are in their zero position when they, seen in the drawing, are displaced a little to the right, the angle sensor 1 with the sleeve 2— within a limited deviation of the workpiece actual diameter from the workpiece nominal diameter— is displaced in relation to the cross-slide 4 and the measuring coil 8 mounted stationarily in it is displaced away from the stationary stop 6. From the workpiece diameter measured by means of plunger 9 and measurement pick-up 13, and from the position of the angle sensor 1 and the sleeve 2 relative to the cross-slide 4, is yielded the slack of the workpiece in the feed plane of the cross-slide.

For further clarification, let the following example of figures be given. The workpiece is to obtain at the measuring point a nominal diameter of 100 mm. By means of the plunger 9 and the measurement pick-up 13, an actual diameter of 101 mm is measured. By means of the measurement pick-up 8, for example a displacement of the sleeve 2 and hence of the angle sensor 1 relative to the cross-slide 4 by 2 mm out of the zero position is measured. From this is yielded at the measuring point a slack in the feed plane of $2 - \frac{1}{2}(101-100) = 12.5$ mm.

With this method according to the invention therefore, the diameter of the workpiece is determined at the measured point from the displacement of the plunger 9 relative to the sleeve 2 by means of the second measurement pick-up 13. Simultaneously, by means of the first measurement pick-up 8 the precise position of the angle sensor and hence the slack of the workpiece is ascertained. This measurement can be repeated at different points of the workpiece along its axis of rotation. Computational correlation of the slack components from the individual measuring points yield the new reference line which deviates from the axis of rotation and according to which feeding of the tool has to take place in precision working of the workpiece.

What is claimed:

1. Apparatus for precision turning horizontally clamped workpieces which are inclined to sag comprising:
   (A) a numerically controlled lathe having a cross-slide;
   (B) a sleeve mounted axially displaceably for limited movement in a bore in said cross-slide and extending in the tool feed direction of the lathe, said sleeve being normally biased outwardly;
   (C) said sleeve having a pair of outwardly extending diverging arms at the proximal end thereof;
   (D) a first measurement pickup disposed within the sleeve near the distal end thereof for determining the displacement of the sleeve;
   (E) a plunger axially displaceably disposed for limited movement in said sleeve at the proximal end thereof and extending outwardly between said arms, said plunger being normally biased outwardly; and
   (F) a second measurement pickup disposed in the sleeve near the proximal end thereof for determining the displacement of the plunger;
   (G) whereby when said arms are placed over a workpiece, said plunger is displaced in relation to said sleeve until said arms abut the workpiece, thereby measuring the workpiece diameter through said second pickup, and said sleeve is then displaced in relation to said cross-slide, thereby measuring the slack of the workpiece through said first pickup.

2. Apparatus according to claim 1, wherein said sleeve has a collar at the distal end thereof and is biased outwardly by a spring disposed between the collar and the distal end of the bore, said bore having a shoulder against which said collar rests.

3. Apparatus according to claim 1, wherein said plunger has a collar bearing against a shoulder at the proximal end of said sleeve and is biased outwardly by a spring bearing against said collar.

* * * * *